Oct. 28, 1930. J. R. OISHEI 1,780,143
MOTOR VEHICLE VENTILATING FAN
Filed June 16, 1926 3 Sheets-Sheet 1
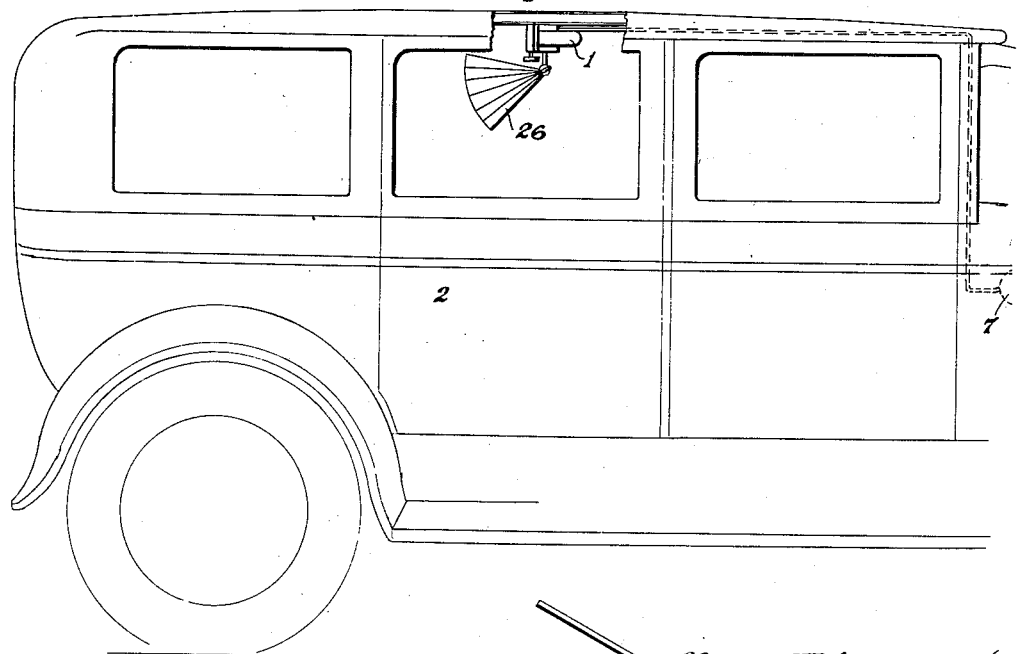
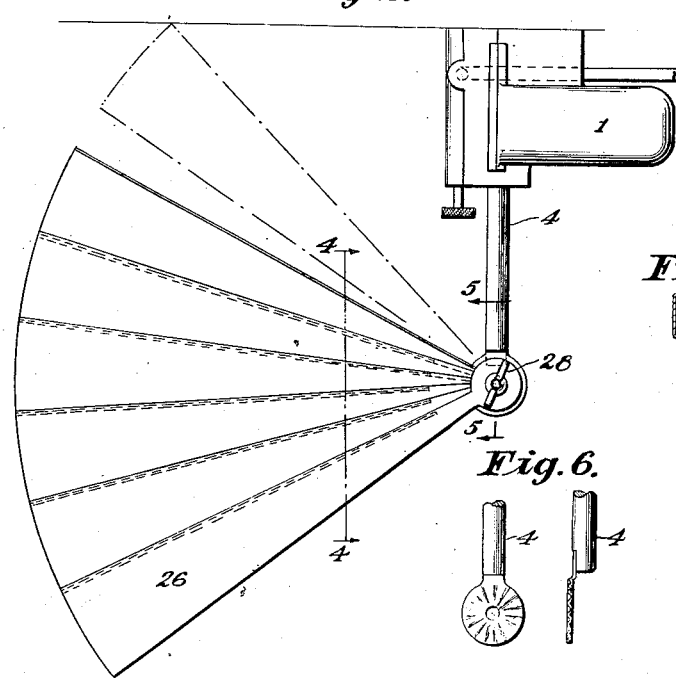
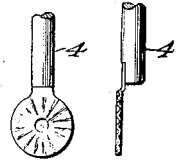
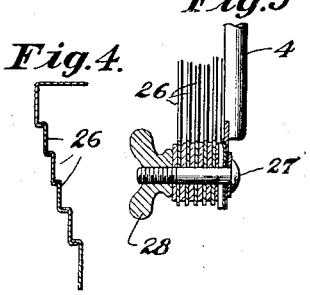
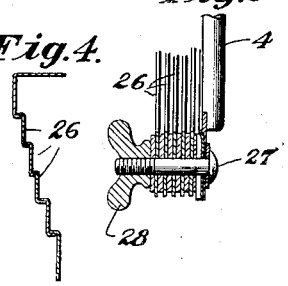
Inventor
John R. Oishei
Barton A. Bean Jr.
Atty.

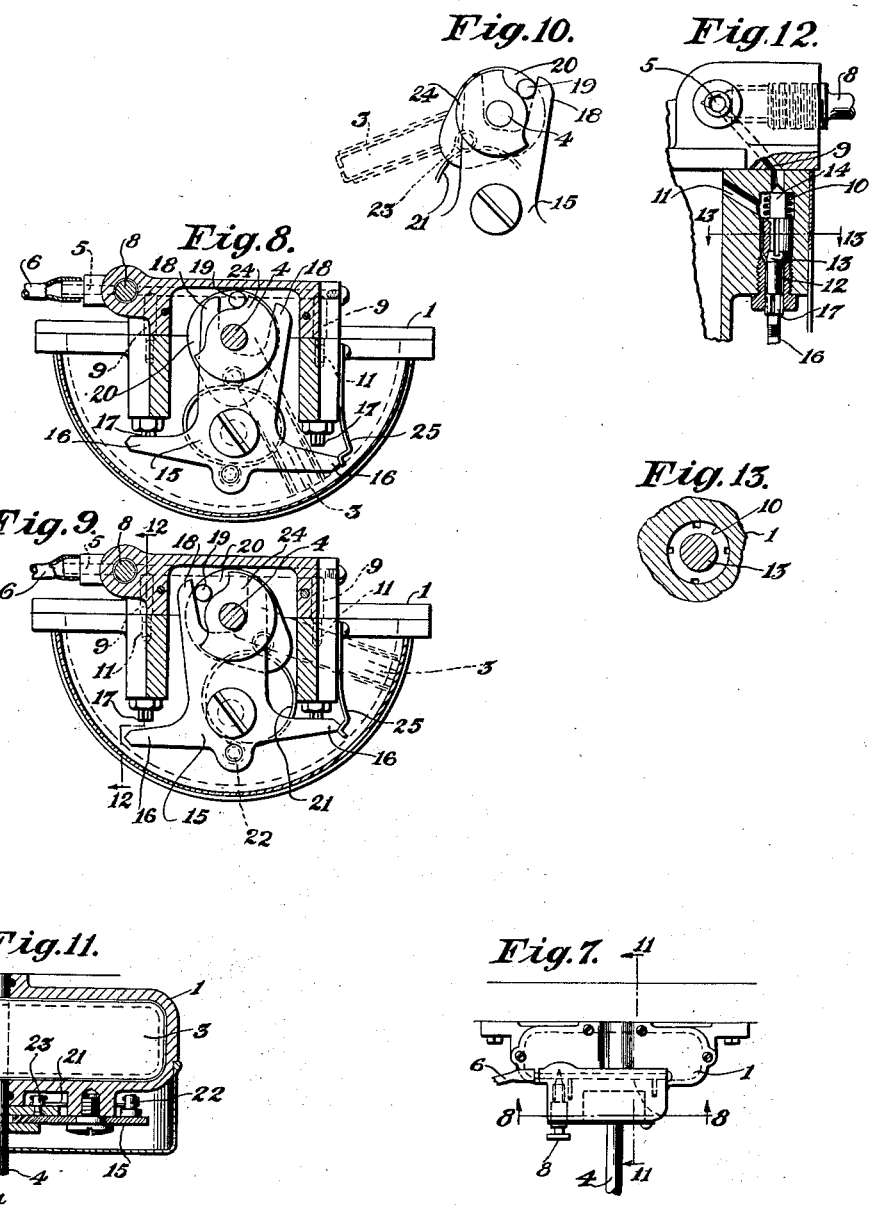

Oct. 28, 1930. J. R. OISHEI 1,780,143
MOTOR VEHICLE VENTILATING FAN
Filed June 16, 1926 3 Sheets-Sheet 3
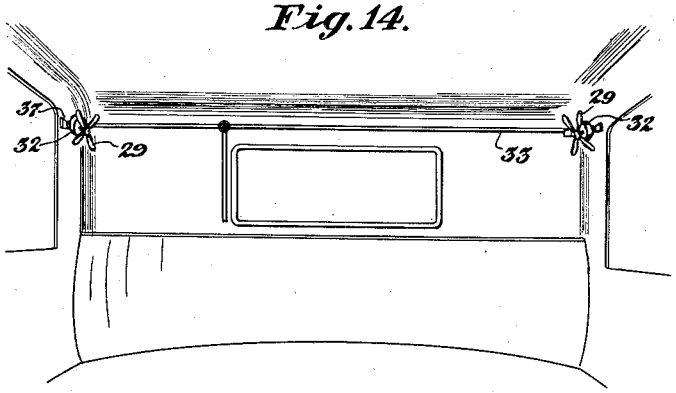
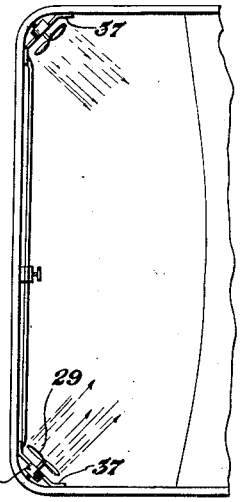
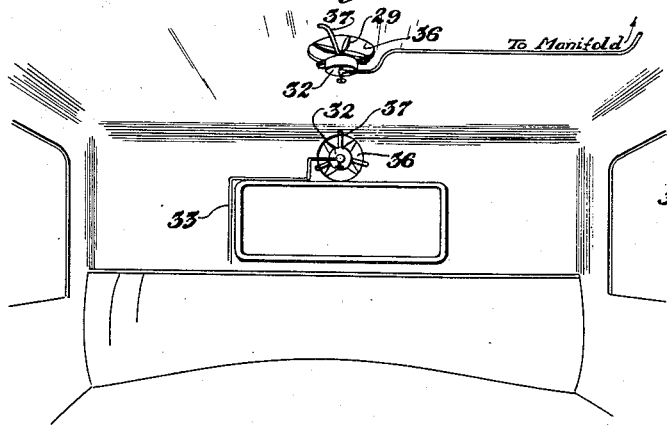
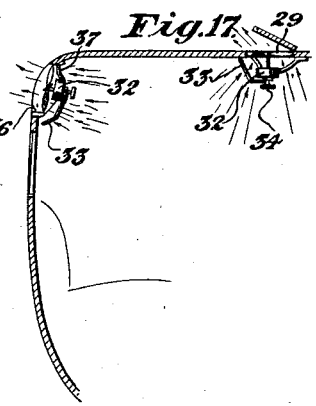
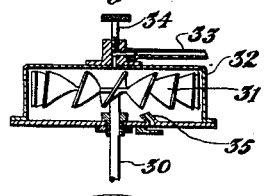
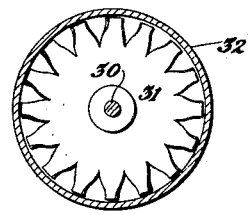
Inventor
John R. Oishei
Barton & Bean Jr
Atty.

Patented Oct. 28, 1930

1,780,143

UNITED STATES PATENT OFFICE

JOHN R. OISHEI, OF BUFFALO, NEW YORK, ASSIGNOR TO TRICO PRODUCTS CORPORATION, OF BUFFALO, NEW YORK

MOTOR-VEHICLE VENTILATING FAN   REISSUED

Application filed June 16, 1926. Serial No. 116,333.

This invention relates to a motor vehicle fan especially designed for effecting a proper ventilation or stirring of the atmosphere about the occupants thereof, the fan being primarily designed for use in the passenger compartment of closed cars.

On warm days, and especially when the motor vehicle has come to a stop for any reason whatsoever, the heat within the car is very noticeable, and more especially when there is no breeze stirring from the outside. Again, during the summer months when the atmosphere is quite humid, and especially during a heavy shower, the windows or panels of the vehicle become more or less steamed or have a vapor condensed on the glass, by reason of the fact that the atmosphere within the car is not being stirred or properly ventilated.

The primary object of this invention is to provide a motor vehicle fan which may be installed so as to fan the air into the faces of the passengers, or to create a breeze about them for effectively cooling them. A further object of the invention is to provide a motor vehicle fan having a fluid pressure motor operative on a low pressure such as that induced in the intake manifold of the internal combustion engine of such motor vehicle.

Another object of the invention is to provide a fluid pressure motor of the suction operated type which will not only stir air within the vehicle, but will also remove the air to a certain extent so as to effect a more or less continuous changing of the atmosphere within the passenger compartment.

The invention further resides in the mounting of the fan whereby it may be disposed in an out-of-the-way position up against the ceiling of the car when the fan is not in use.

In the accompanying drawings:

Fig. 1 is a fragmentary side elevation of a motor vehicle of the closed car type, illustrating the application of the present invention;

Fig. 2 is a side elevation of the improved motor vehicle ventilating fan shown on an enlarged scale;

Fig. 3 is a top plan view of the motor fan;

Fig. 4 is a transverse section through the fan element in its open position, as viewed about on line 4—4 of Fig. 2;

Fig. 5 is a detailed section on line 5—5 of Fig. 2, further disclosing the construction of the fan element;

Fig. 6 is a view further disclosing the detailed construction of the fan element;

Fig. 7 is a side elevation of the fan motor;

Fig. 8 is a transverse section through the valve mechanism of the motor, about on line 8—8 of Fig. 7, showing the valve mechanism in one position;

Fig. 9 is a similar view depicting the valve mechanism in another operative position;

Fig. 10 is a detailed elevation further illustrating the valve actuating mechanism;

Fig. 11 is a vertical sectional view about on line 11—11 of Fig. 7, showing more clearly the valve mechanism;

Fig. 12 is a transverse sectional view about on line 12—12 of Fig. 9 through one of the operating valves;

Fig. 13 is a detailed cross section on line 13—13 of Fig. 12;

Fig. 14 is a view from within a closed car showing the installation of a modified type of fan;

Fig. 15 is a plan view of the same, as viewed with the top of the vehicle removed;

Fig. 16 is a view similar to Fig. 14 showing a further modified fan construction installed in a motor vehicle;

Fig. 17 is a vertical fragmentary section through the vehicle showing the fan installation of Fig. 16;

Fig. 18 is a transverse section through the fluid pressure motor of the modified fan constructions shown in Figs. 14 and 16, the rotor, its shaft and control valve being shown in elevation; and Fig. 19 is a sectional view through the modified motor construction showing more particularly the rotor thereof.

Referring more in detail to the accompanying drawings, the type of motor shown in Fig. 1 is of the oscillatory, fluid pressure or suction operated type, and comprising a casing 1 which is adapted to be secured to the ceiling of the car 2, a piston or vane 3 arranged within the casing 1, a shaft 4 journaled in the casing and having the piston or vane fixed thereto, and an automatic valve mechanism for alternately connecting the opposite ends of the casing, or the casing on the opposite sides of the piston, to a source of operating pressure. The casing is provided with a suction passage 5 which is connected by a tube 6 to the intake manifold 7 of the engine (not shown), and this passage 5 has a main control valve 8 which may be manually operated to open or close communication between the motor and the manifold. Said passage 5 is provided with two branch conduits 9, each leading to a valve chamber 10, from which latter communication is obtained with the piston chamber to the respective sides of the piston 3 by a conduit 11. This valve chamber also has communication to the atmosphere through a passage 12, which is adapted to be closed by a spring seated valve 13 which carries a valve 14 for closing the suction passage 9 when the valve 13 is unseated. Thus the valve device 13, 14, alternately opens its side of the casing, first to the source of suction or low pressure and then to the atmosphere. The means for operating the two valves consists of a rocker 15 having oppositely extending arms 16 underlying the stems 17 of the valves 13. This rocker also embodies an upwardly extending bifurcated arm 18 which straddles the shaft 4 and is adapted to have its opposing furcations alternately engaged by a pin 19 fixed to a kicker plate 20, said kicker plate being pivoted on the shaft 4. A spring 21 connects a lateral pin 22 on the rocker member 15 to a lateral pin 23 on the kicker member 20 so that the resulting action will be to effect a quick movement of the kicker member 20 after the pin passes a "dead center" position. An actuating member 24 is fixed on the shaft 4 to rock therewith, and as it rocks, said actuator will engage the pin 19 and start the movement of the kicker toward a position in which the pin 23 will be aligned with the pin 22 and the shaft 4, and as the pin 23 moves beyond this alignment, or "dead center" position, the potential energy of the tensioned spring 21 will quickly act to continue swinging the kicker 20 and bring its pin 19 against the opposite furcation 18 to rock the member 15 and thereby reverse the position of the two sets of valves 13 and 14 so that one valve 13 will be seated while the other valve 13 is unseated, and a reverse relation of the valves 14. As the rocker member is rocked, one of its arms 16 is alternately moved past a retaining projection on a leaf spring 25 which acts to yieldably lock the rocker in both of its positions. This valve actuation will alternately connect the two passages 11 to the source of suction, and the unconnected passage 11 will be in communication with the atmosphere, whereby the piston will be oscillated back and forth and effect a rocking of the shaft 4.

On the lower end of shaft 4 is mounted a fan of the leaf type, the same comprising a plurality of leaves 26 pivotally connected to the shaft whereby the leaves may be opened or closed, the construction herein shown embodying a pivot bolt 27 about which the leaves pivot and a clamping nut 28 which may be adjusted to secure the leaves 26 at a desired adjustment. The full-line showing of Figs. 1 and 2 illustrates the fan element in this operative position, the angle of which may be varied, and when it is desired to discontinue the use of the fan, the leaves may be folded or collapsed and moved to an out-of-the-way position such as is indicated by the dot and dash showing in Fig. 2. The fan is shown disposed in advance of the rear seat and may be folded or swung to one side to permit a ready entrance or exit from the car.

From the foregoing it will be noted that a novel motor fan construction has been provided which is operated from the motor vehicle engine without subtraction from the power of the latter, and one which will gently waft the breezes over the occupants in the passenger compartment. Obviously, the fans may be distributed throughout the car and may be utilized to cool the occupant or occupants of the front seat as well as those of the rear seat.

In Fig. 14 is shown another arrangement of fans which are disposed near the ceiling of the car and to the rear of the back seat, the fans in this instance being of the rotary type and comprising a fan element 29 fixed to a shaft 30 of a rotor or bladed piston 31. This rotor is disposed within a casing 32 from which the air is exhausted through a conduit 33 which is in turn connected to the intake manifold, valve 34 being inserted in the conduit 33 to control the fan operation. On the opposite side of the casing 32 from which the air is exhausted is a nozzle 35 which is designed to direct an inflowing current of air against the blades of the rotor so that in this modification the atmosphere from within the car will also be exhausted through the motor.

In Figs. 16 and 17 are shown ventilating fans similar to those depicted in Figs. 13 and 14 with the exception that they are reversed and designed to pull or force the air from within the car out through openings 36 provided in the walls of the vehicle. A similar type of rotary motor is employed to drive this fan, which may be supported from the ceiling or the vehicle wall, by suitable brackets 37. In the modifications shown in Figs. 14-17, a more or less steady breeze is generated about the passengers so as to effect a constant agitation of the atmosphere and a continuous renewing of the same by the exhaustion through the operating fan motor.

What is claimed as new is:

1. A motor vehicle fan for closed cars, comprising, in combination with the closed passenger compartment of a motor vehicle, a fan element arranged therein for effecting a change of atmosphere about the occupants, a suction operated, fluid pressure motor arranged within the passenger compartment for operating the fan element and having its inlet opening into said passenger compartment, and a suction passage between the motor and the internal combustion engine of the motor vehicle for having a low pressure induced therein by said engine whereby the atmosphere from within the passenger compartment will be drawn through said motor and effect an operation of the same.

2. A fluid pressure operated fan for the passenger compartment of a motor vehicle, comprising a fan element, a suction operated motor having a shaft directly supporting the fan element for agitating the air thereabout, and suction inducing means connected to the motor for operating the same, said motor opening to the atmosphere within the passenger compartment whereby the agitated air therein will be in part withdrawn therefrom through the motor by said suction inducing means and thereby gradually effect a change of air in the passenger compartment.

3. In a fan construction for the passenger compartment of motor vehicles, a fan element, a fluid pressure motor for operating the fan element to agitate the air in the compartment, and means for directing a part of the air within the compartment through the motor to actuate the same whereby the air within the compartment will be both agitated by the fan element and exhausted by the motor to effect a change in the atmosphere.

4. A motor vehicle ventilating fan operable from the low pressure induced in the intake manifold of internal combustion engines, comprising a motor including a shaft, and a collapsible leaf fan element operable by the shaft and foldable to an inoperative position to lie out of the way of the occupants of the motor vehicle.

5. A motor vehicle ventilating fan comprising a motor adapted to be mounted adjacent the roof of a motor vehicle and a fan element foldable up against the roof to an inoperative position and adapted to be lowered to a position opposite the occupants of the vehicle to direct a breeze toward them.

6. A motor vehicle ventilating fan comprising a motor adapted to be mounted adjacent the roof of a motor vehicle and a fan element operable thereby and consisting of a plurality of leaves foldable up against the roof to an inoperative position and adapted to be unfolded downwardly to a position substantially opposite the occupants of the vehicle.

7. In a motor vehicle construction having an entrance way to a seat thereof, a motor driven fan embodying a fan element normally disposed in the entrance way for operating to create a breeze toward the occupant of the seat, and movable out of the entrance way to permit unobstructed entrance and exit of passengers, and means mounting the fan element for movement to and from its normally operative position.

JOHN R. OISHEI.